United States Patent [19]
Veltum et al.

[11] Patent Number: 5,639,393
[45] Date of Patent: Jun. 17, 1997

[54] ELECTRICALLY HEATED OPTOELECTRONIC DEVICE FOR DETECTING MOISTURE ON A TRANSPARENT PANE

[75] Inventors: Christian Veltum, Iserlohn; Jürgen Levers, Bochum; Berthold Esders, Schalksmühle, all of Germany

[73] Assignee: Leopold Kostal GmbH & Co. KG, Germany

[21] Appl. No.: 354,260

[22] Filed: Dec. 12, 1994

[51] Int. Cl.6 .............................. H05B 1/00; G08B 21/00
[52] U.S. Cl. ........................ 219/209; 318/483; 340/602
[58] Field of Search ........................ 219/209, 202,
   219/203, 522; 318/DIG. 2, 480, 483; 356/239,
   445; 250/341.8; 15/250.001, 250.12; 340/602

[56] References Cited

U.S. PATENT DOCUMENTS

| | | | |
|---|---|---|---|
| 4,355,271 | 10/1982 | Noack | 318/DIG. 2 |
| 4,481,450 | 11/1984 | Watanabe et al. | 318/DIG. 2 |
| 4,701,613 | 10/1987 | Watanabe et al. | 250/341.8 |
| 4,960,996 | 10/1990 | Hochstein | 318/DIG. 2 |
| 5,391,891 | 2/1995 | Wiegleb et al. | 250/341.8 |
| 5,543,923 | 8/1996 | Levers et al. | 318/DIG. 2 |

FOREIGN PATENT DOCUMENTS

| | | | |
|---|---|---|---|
| 3314770 | 10/1984 | Germany. | |
| 3823300 | 8/1989 | Germany. | |
| 4202121 | 12/1992 | Germany. | |
| 4307479 | 2/1994 | Germany. | |
| 62-17642 | 1/1987 | Japan. | |
| 2143945 | 2/1985 | United Kingdom | 356/445 |
| 9415819 | 7/1994 | WIPO. | |
| 9605087 | 2/1996 | WIPO. | |

Primary Examiner—Teresa J. Walberg
Assistant Examiner—Raphael Valencia
Attorney, Agent, or Firm—Brooks & Kushman P.C.

[57] ABSTRACT

An optoelectronic sensor device which has a beam transmitter/beam receiver arrangement associated with a beam guide element. The arrangement is disposed together with a heating device in a common housing. In order to install the heating device in a convenient manner in the surrounding area of the sensor device, the heating device consists of at least one heat conducting plate fixed to a support part, which is allocated with its substantial main areas to the beam guide element and is connected by at least one connection arm to the electrical printed circuit board. The heating device includes at least one heating element, which is disposed in the proximity of a connection arm directly on the electrical printed circuit board. For communicating the necessary heat into the heat conducting plate, the printed circuit board is connected at least in a material-locking manner to an associated connection arm.

20 Claims, 1 Drawing Sheet

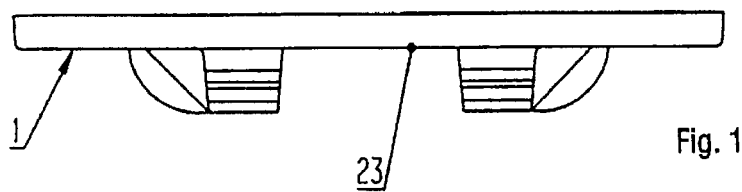
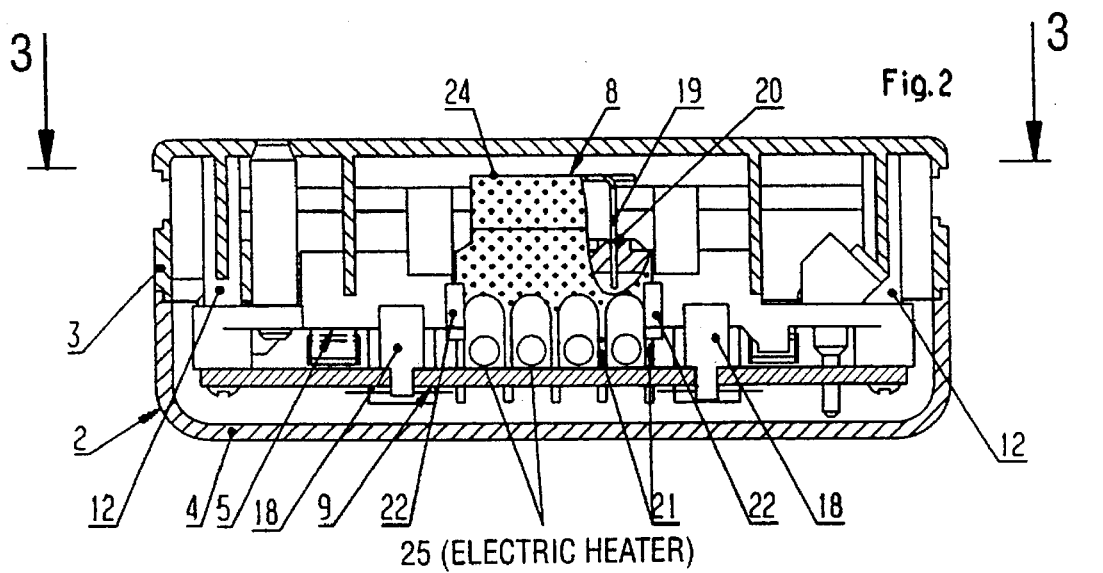
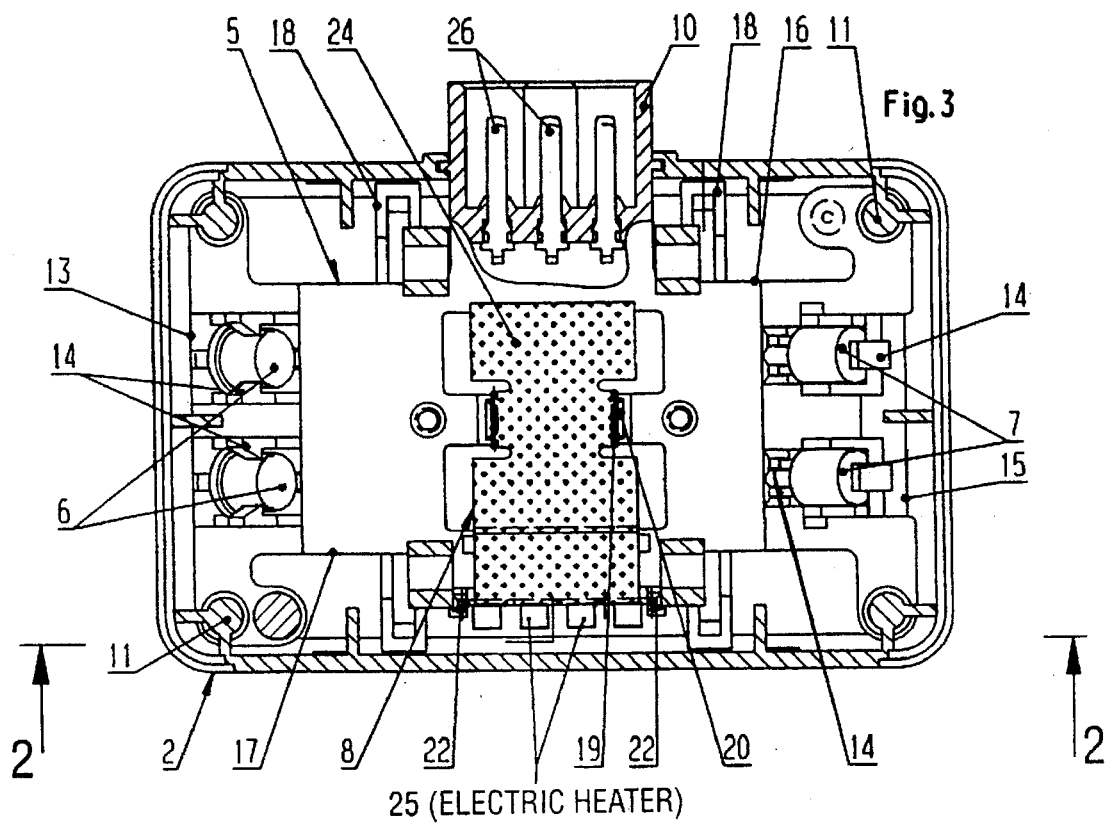

ELECTRICALLY HEATED OPTOELECTRONIC DEVICE FOR DETECTING MOISTURE ON A TRANSPARENT PANE

TECHNICAL FIELD

The invention relates to an optoelectronic sensor device for detecting the degree of wetting of a transparent pane. The purpose of such devices is to influence an associated windscreen wiping system in dependence upon the quantity of precipitation located on the windscreen of a motor vehicle.

BACKGROUND ART

A device for controlling a motor-driven windscreen wiping device has become known from DE 33 14 770 C1. A beam guide element is attached to the inner surface of a transparent pane. Beams are emitted from an associated beam transmitter via the beam guide element into the transparent pane. After at least one reflection at the outer surface of the pane, the beams are decoupled by the beam guide element and are directed to an associated beam receiver. Such a sensor device must for the purpose of guaranteeing an accurate measurement in particular in a motor vehicle environment, be provided with a heating device. A sensor device of this type equipped with a heating device has become known from DE 42 02 121 C1.

SUMMARY OF THE INVENTION

In the present invention, a recess provided for receiving a heating device is provided centrally in the beam guide element. A support part connected to the housing of the sensor device serves to fix the printed circuit board which is electrically connected to the contact parts of the beam transmitter, the beam receiver, and the heating device.

The aim of the present invention is to develop further known sensor devices in such a way that the necessary heating device can be installed in a particularly convenient and inexpensive manner in the surrounding area of the sensor device.

Disclosed herein is an optoelectronic sensor device wherein an electrical printed circuit board is attached on a side of a support part remote from the beam guide element. The board is connected to contact parts which are necessary for electrical connection of the beam transmitter. A heating device comprising at least one conducting plate is fixed on the support part. the plate has substantial main areas adjacent the beam guide element.

Connected to the electrical printed circuit board is at least one connecting arm. The arm is formed as an integral part.

The heating device comprises at least one heating element which produces heat and which is disposed directly on the electrical printed circuit board in the proximity of the at least one connection arm. The heating device communicates heat into the heat conducting plate. The heating element is connected to an associated connection arm preferably by the application of connection material, such as solder, or by a mechanical contact. The advantage with such a development is that the sensor device is broken down into subassemblies which can be functionally checked in advance and which can be conveniently and inexpensively combined to form a complete sensor device.

Further advantageous embodiments of the device in accordance with the invention are described in greater detail with reference to an embodiment illustrated in the drawings.

BRIEF DESCRIPTION OF THE DRAWINGS

FIG. 1 illustrates a frontal view of a beam guide element which is allocated to the sensor device as shown in FIGS. 2 and 3 and is to be coupled to a transparent pane;

FIG. 2 illustrates a cross-sectional view of the sensor device without the beam guide element according to the line 2—2 in FIG. 3; and FIG. 3 illustrates a cross-sectional view of the sensor device without the beam guide element according to the line 3—3 of FIG. 2.

BEST MODE FOR CARRYING OUT THE INVENTION

As the drawing shows, an optoelectronic sensor device is provided to detect the degree of wetting of a transparent glass pane by for example drop-shaped natural precipitation. The device comprises in particular a beam guide element 1 which is attached by means of an adhesive layer (for the sake of simplicity not illustrated). The layer is, for example, permeable to infrared beams and is affixed to the inner unexposed surface of the pane (likewise not illustrated). The pane is the windscreen of a motor vehicle on which the sensor device, disposed in a housing 2, is provided at an exposed point, i.e. a point which does not impair vision but is suitable for detecting the precipitation.

The housing 2 is manufactured from a synthetic material, such as plastic. It consists in particular of a housing upper part 3 which faces the pane and is connected to the beam guide element 1 and a tub-shaped housing lower part 4 which forms a dust-tight closure. A support part 5 is fixed at the housing upper part 3. The support part is provided for the purpose of receiving and holding two beam transmitters 6, two beam receivers 7, a heat conducting plate 8 and an electrical printed circuit board 9. Moreover, a housing configuration 10 of an electrical plug connection coupling is formed as an integral part onto the support part 5.

As is especially evident from FIGS. 2 and 3, the support part 5 manufactured from a synthetic material, such as plastic, includes a through hole 11 at its four outer corner regions. For the purpose of fixing the support part 5 on the housing upper part 3, the four through holes 11 are penetrated each by a fixing dome 12. The four fixing domes 12 are formed integrally on the surface of the housing upper part 3 remote from the pane and extend perpendicular to the course of the pane into the housing inner chamber.

In the region of a first narrow side 13 of the support part 5, retaining elements 14 for receiving the beam transmitters 6 are provided as an integral part between the two through holes 11 associated with these narrow sides 13. At the second narrow side 15, corresponding and opposite lying retaining elements 14 for the beam receivers 7 are formed as one on the support part 5. By virtue of the interaction between the four through holes 11 of the support part 5 and the four fixing domes 12 of the housing upper part 3, the beam transmitters 6 fixed to the support part 5 as well as the beam receivers 7 are disposed in the correct position with respect to the beam guide element 1, which in turn is fixed to the housing upper part 3 by means of clip elements. The electrical connection contact parts of the two beam transmitters 6 and of the two beam receivers 7 are guided through the body of the support part 5 and are connected to the associated electrical strip conductors of the electrical printed circuit board 9. The electrical printed circuit board 9 is held at the side of the support part 5 remote from the beam guide element 1 by way of two clip arms 18 integrally formed onto each of the two longer sides 16, 17.

In the center between the beam transmitters 6 and the beam receivers 7, the heat conducting plate 8 is fixed outside the beam path in a suitable position on the support part 5. Retaining legs 19 of the heat conducting plate 8 engage for this purpose in retaining slots 20 of the support part 5. The two retaining legs 19 extend from the main areas 24 of the heat conducting plate which extend parallel to the rearward surface 23 of the beam guide element 1 and are bent perpendicularly downwards in relation thereto. The heat conducting plate 8 has basically an L-shaped cross-section, wherein the main areas 24 which extend parallel to the rearward surface 23 of the beam guide element 1 form the first limb. The second limb comprises five mutually parallel connection arms 21. To support the positionally correct manner in which the heat conducting plate 8 is held, the two outer connection arms 21 of the second limb engage in each case in a retaining groove 22 provided in the longer side 17 of the support part 5. The second limb has an overall comb-like shape by virtue of the five mutually parallel connection arms 21.

The free ends of the connection arms 21 protrude at their connection points through the electrical printed circuit board 9 and are connected to a metallic conductor strip.

Four heating elements 25 are arranged on the electrical printed circuit board 9 between the five connection points of the connection arms 21. In order to provide a thermal coupling to the heat conducting plate 8 and thus to form a heating device, the four heating elements 25 are connected to the connection arms (21) via printed circuit board (9) itself and a metallic conductor strip arranged therein, by means of additionally applied material. Thus, both the electrical printed circuit board 9 and the metallic conductor strip substantially contribute to the transmission of heat. In order to produce a connection which has improved thermal characteristics, solder is applied at the connection points provided between the metallic conductor strip, the connection arms 21, and the heating elements 25.

In order to be able to meet heat requirements which are dependent upon the ambient temperature and thus vary, current is supplied in pulses to the heating device. In order to achieve different heat outputs, the ambient temperature is ascertained and subsequently the pulse/pause ratio of the current supply is changed accordingly. The heat output is however also dependent upon the supply voltage available. In order to compensate for these influences, the amount of supply voltage is ascertained and the pulse/pause ratio is subsequently correspondingly adjusted.

The housing configuration 10 of a plug connection coupling is formed as an integral part on the longer side 16 of the support part 5 which lies opposite the longer side 17. The electrical contact parts 26 of the plug connection coupling are connected at one side to the associated electrical conductor strips of the electrical printed circuit board 9 and at the other side are formed as plug contact parts and extend outwards from the inner chamber of the housing 2. The electrical supply is provided to the electrical/electronic components of the sensor device by the electrical contact parts 26. A corresponding counter plug connection part can be connected directly to the plug connection coupling of the support part 5. In each case, a U-shaped recess in the associated side wall of the housing upper part 3 and of the housing lower part 4 surround the housing configuration 10 of the support part 5 to form a close file.

The support part 5 thus represents an integral retaining device for all those components of the sensor device which are connected to the electrical printed circuit board 9. Because the heating elements 25 are moreover arranged directly on the electrical printed circuit board 9 which is likewise fixed on the support part 5, a subassembly is produced. In that subassembly, all necessary material connections (soldering) can be carried out in one automated procedure. Moreover, this subassembly can be functionally tested prior to the sensor device being completely assembled, so that it is possible to manufacture the sensor device in an manner which is cost-effective and produces few defective parts.

A complete sensor device is assembled as follows: firstly, the electrical printed circuit board 9 which has been previously fitted with some electrical/electronic components is fixed by the clip arms 18 to the support part 5 which is provided with the electrical contact parts 26. The beam transmitters 6 in the form of diodes and the beam receivers 7, as well as the heat conducting plate 8 which is made from copper are fixed on the support part 5 and are connected to the electrical printed circuit board 9.

An automated soldering procedure then solders all the connection points which are to be soldered and which are associated with the electrical printed circuit board 9. The support part 5, together with the electrical printed circuit board 9, is then attached to the housing upper part 3.

For attachment purposes, after they have penetrated the through holes 11, the free ends of the fixing domes 12 can be provided with a screw. It is naturally also possible to attach the support part 5 by subjecting the fixing domes 12 by heat caulking. The housing lower part 4 is then clipped on to the housing upper part 3 to provide a dust-tight cover. Finally, the housing 2 assembled in this way is placed on the beam guide element 1, which has been previously coupled to the pane, and fixed thereto by means of clips.

While the best mode for carrying out the invention has been described in detail, those familiar with the art to which this invention relates will recognize various alternative designs and embodiments for practicing the invention as defined by the following claims.

What is claimed is:

1. An optoelectronic sensor device for detecting moisture on a transparent pane in the form of drop-shaped precipitation, wherein the front surface of a beam guide element which is exposed to the heat of a heating device and which is coupled to the inner surface of the pane not exposed to the precipitation in the region of a wiping area covered by a motor-driven windscreen wiper device, the beam guide element being located in a spaced disposition to at least one beam transmitter and at least one beam receiver by a support part fixed in the inner chamber of a housing so that beams emitted by the beam transmitter are reflected dependent upon the precipitation on the pane and directed to the beam receiver, which supplies a signal dependent upon the associated quantity of precipitation, the optoelectronic device including:

an electrical printed circuit board attached on a side of the support part remote from the beam guide element, the electrical printed circuit board being connected to connection contact parts necessary for electrical connection of the beam transmitter, the heating device comprising at least one heat conducting and transmitting plate (8) fixed on the support part (5), the plate having at least one main area (24) adjacent the beam guide element (1), whereby the surface area of the plate extends parallel to the pane and is provided in the center region of the beam guide element in such way that the plate is located outside the incident and emergent beams;

at least one connecting arm (21) connected to the electrical printed circuit board (9), each arm being formed as an integral part of the heat conducting and transmitting plate (8);

the heating device comprising at least one heating element (25) which produces heat and which is surface-mounted directly on the electrical printed circuit board (9) in the proximity of the at least one connection arm (21), thereby forming a sub-assembly in which all necessary material connections can be carried out in one automated procedure, and for the purpose of communicating heat into the heat conducting plate (8), the at least one heating element being connected at least through the application of additional heat conducting material to the at least one associated connection arm (21), so that heat is communicated directly to the heat conducting and transmitting plate (8).

2. The sensor device of claim 1, wherein the heating device comprises one heat conducting plate (8) and one heating element (25).

3. The sensor device of claim 1, wherein the heating device comprises one heat conducting plate (8) and a plurality of heating elements (25).

4. The sensor device of claims 1, 2, or 3, wherein the heat conducting plate (8) comprises one connection arm (21) for communicating heat.

5. The sensor device of claims 1, 2, or 3, wherein the heat conducting plate (8) comprises a plurality of connection arms (21) for communicating heat.

6. The sensor device of claim 5, wherein the connection arms (21) are formed as an integral part on one of the side areas of the heat conducting plate (8) and are disposed in a comb-like manner.

7. The sensor device of claims 1, 2, or 3, wherein the heat conducting plate (8) has an L-shaped cross-section and the main areas (24) of the heat conducting plate (8) extend parallel to the rearward surface (23) of the beam guide element (1), each connection arm (21) extending perpendicular to the main areas (24).

8. The sensor device of claims 1, 2, or 3, wherein a resilient arm extends parallel to at least one connection arm (21) and hooks out of the heat conducting plate (8), the resilient arm being connected by its free end region directly to a heating element (25).

9. The sensor device of claims 1, 2, or 3, wherein the connection provided for the transmission of heat is achieved between at least one heating element (25) and the heat conducting plate (8) by the printed circuit board (9) itself and by a metallic conductor strip provided in the printed circuit board (9), wherein solder is applied to each connection point necessary for an electrical or a thermal connection.

10. The sensor device of claims 1, 2, or 3, wherein in order to improve the heat transmission, at least one heating element (25) is connected directly by at least one line of solder to at least one connection arm (21) of the heat conducting plate (8).

11. The sensor device of claims 1, 2, or 3, wherein each heating element (25) comprises a PTC thermistor.

12. The sensor device of claims 1, 2, or 3, wherein each heating element (25) is in the form of a fixed resistor which is provided with current differently depending upon the requirements.

13. The sensor device of claims 1, 2, or 3, wherein a supply voltage for electrical and electronic components of the sensor device is provided by a plug connection coupling associated with support part (5), the electrical contact parts (26) of the plug connection coupling being connected at one side directly with associated electrical conductor strips of the electrical printed circuit board (9) and at the other side extending outwardly from the inner chamber of the housing (2) to connect a counter plug connection part.

14. The sensor device of claim 13, wherein a housing configuration (10) of the plug connection coupling is an integral component of the support part (5).

15. The sensor device of claims 1, 2, or 3, wherein a supply voltage for the electrical and electronic components of the sensor device is provided by an electrical line, electrical conductors of which being connected at one side directly to the electrical conductor strips associated with the electrical printed circuit board (9) and outside the housing (2) being associated at the other side with a plug connection coupling.

16. An optoelectronic sensor device for detecting moisture on a transparent pane in the form of drop-shaped precipitation, wherein the front surface of a beam guide element which is exposed to the heat of a heating device and which is coupled to the inner surface of the pane not exposed to the precipitation in the region of a wiping area covered by a motor-driven windscreen wiper device, the beam guide element being located in a spaced disposition to at least one beam transmitter and at least one beam receiver by a support part fixed in the inner chamber of a housing so that beams emitted by the beam transmitter are reflected dependent upon the precipitation on the pane and directed to the beam receiver, which supplies a signal dependent upon the associated quantity of precipitation, the optoelectronic device including:

an electrical printed circuit board attached on a side of the support part remote from the beam guide element, the electrical printed circuit board being connected to connection contact parts necessary for electrical connection of the beam transmitter, the heating device comprising at least one heat conducting and transmitting plate (8) fixed on the support part (5), the plate having at least one main area (24) substantially adjacent to the surface of the beam guide element (1), whereby the surface of the beam guide element extends parallel to the pane and is disposed in the center region of the beam guide element in such way that the plate is located outside of incident and emergent beams;

at least one connecting arm (21) connected to the electrical printed circuit board (9), each arm being formed as an integral part of the heat conducting and transmitting plate (8);

the heating device comprising at least one heating element (25) which produces heat and which is mounted on the surface of the electrical printed circuit board (9) in the proximity of the at least one connection arm (21) and for the purpose of communicating heat into the heat conducting plate (8), the at least one heating element being connected at least through the application of additional heat conducting material to an at least one of the associated connection arms (21), so that heat is delivered directly to the heat conducting plate (8), wherein the heat conducting plate (8) has an L-shaped cross-section and the main areas (24) of the heat conducting plate (8) extend parallel to the rearward surface (23) of the beam guide element (1), each connection arm (21) extending perpendicular to the at least one main area (24) of the plate (8).

17. An optoelectronic sensor device for detecting moisture on a transparent pane in the form of drop-shaped precipitation, wherein the front surface of a beam guide element which is exposed to the heat of a heating device is coupled to the inner surface of the pane not exposed to the precipitation in the region of a wiping area covered by a motor-driven windscreen wiper device, the beam guide element being located in a spaced disposition to at least one beam transmitter and at least one beam receiver by a support part fixed in the inner chamber of a housing so that beams emitted by the beam transmitter are reflected dependent upon the precipitation on the pane and directed to the beam receiver, which supplies a signal dependent upon the associated quantity of precipitation, the optoelectronic device including:

an electrical printed circuit board attached on a side of the support part remote from the beam guide element, the electrical printed circuit board being connected to connection contact parts necessary for electrical connection of the beam transmitter, the heating device comprising at least one heat conducting and transmitting plate (8) fixed on the support part (5), the plate having at least one main area (24) adjacent to a surface of the beam guide element (1), whereby the surface of the beam guide element extends parallel to the pane and is provided in the center region of the plate element in such a way that the plate is located outside of incident and emergent beams;

at least one connecting arm (21) connected to the electrical printed circuit board (9), each arm being formed as an integral part of the heat conducting and transmitting plate (8);

the heating device comprising at least one heating element (25) which produces heat and which is mounted directly on the electrical printed circuit board (9) in the proximity of the at least one connection arm (21) and for the purpose of communicating heat into the heat conducting and transmitting plate (8), the heating element being connected at least through the application of additional heat conducting material to an associated connection arm (21), so that heat is delivered directly to the plate (8), wherein a resilient arm extends parallel to the at least one connection arm (21) and hooks out of the heat conducting and transmitting plate (8), the resilient arm being connected by its free end region directly to a heating element (25).

18. An optoelectronic sensor device for detecting moisture on a transparent pane in the form of drop-shaped precipitation, wherein the front surface of a beam guide element which is exposed to heat and is influenced by a heating device and which is coupled to the inner surface of the pane not exposed to the precipitation in the region of a wiping area covered by a motor-driven windscreen wiper device, the beam guide element being located in a spaced disposition to at least one beam transmitter and at least one beam receiver by a support part fixed in the inner chamber of a housing so that beams emitted by the beam transmitter are reflected dependent upon the precipitation on the pane and directed to the beam receiver, which supplies a signal dependent upon the associated quantity of precipitation, the optoelectronic device including:

an electrical printed circuit board attached on a side of the support part remote from the beam guide element, the electrical printed circuit board being connected to connection contact parts necessary for electrical connection of the beam transmitter, the heating device comprising at least one heat conducting and transmitting plate (8) fixed on the support part (5), the plate having at least one main area (24) adjacent to a surface of the beam guide element (1), whereby the surface area extends parallel to the pane and is provided in the center region of the beam guide element in such a way that it is located outside of incident and emergent beams;

at least one connecting arm (21) connected to the electrical printed circuit board (9), the arm being formed as an integral part of the heat conducting and transmitting plate (8);

the heating device comprising at least one heating element (25) which produces heat and which is mounted directly on the electrical printed circuit board (9) in the proximity of the at least one connection arm (21) and for the purpose of communicating heat into the heat conducting and transmitting plate (8), the at least one heating element being connected at least through the application of additional heat conducting material to at least one associated connection arm (21), so that heat is delivered directly by the heat conducting and transmitting plate (8), wherein a supply voltage for electrical and electronic components of the sensor device is provided by a plug connection coupling associated with support part (5), the electrical contact parts (26) of the plug connection coupling being connected at one side directly with associated electrical conductor strips of the electrical printed circuit board (9) and at the other side extending outwardly from the inner chamber of the housing (2) to connect a counter plug connection part.

19. The sensor device of claim 18, wherein a housing configuration (10) of the plug connection coupling is an integral component of the support part (5).

20. An optoelectronic sensor device for detecting moisture on a transparent pane in the form of drop-shaped precipitation, wherein the front surface of a beam guide element which is exposed to heat from by a heating device and which is coupled to the inner surface of the pane not exposed to the precipitation in the region of a wiping area covered by a motor-driven windscreen wiper device, the beam guide element being located in a spaced disposition to at least one beam transmitter and at least one beam receiver by a support part fixed in the inner chamber of a housing so that beams emitted by the beam transmitter are reflected dependent upon the precipitation on the pane and directed to the beam receiver, which supplies a signal dependent upon the associated quantity of precipitation, the optoelectronic device including:

an electrical printed circuit board attached on a side of the support part remote from the beam guide element, the electrical printed circuit board being connected to connection contact parts necessary for electrical connection of the beam transmitter, the heating device comprising at least one heat conducting and transmitting plate (8) fixed on the support part (5), the plate having at least one main area (24) adjacent to a surface of the beam guide element (1), whereby the surface area extends parallel to the pane and is provided in the center region of the beam guide element in such a way that it is located outside of incident and emergent beams;

at least one connecting arm (21) connected to the electrical printed circuit board (9), the arm being formed as an integral part of the heat conducting and transmitting plate (8);

the heating device comprising at least one heating element (25) which produces heat and which is mounted directly on the electrical printed circuit board (9) in the proximity of the at least one connection arm (21) and for the purpose of communicating heat into the heat conducting and transmitting plate (8), the heating element being connected at least through the application of additional heat conductivity material to at least one connection arm (21), so that heat is delivered directly by the heat conducting plate (8), wherein a supply voltage for the electrical and electronic components of the sensor device is provided by an electrical line, electrical conductors of which being connected at one side directly to the electrical conductor strips associated with the electrical printed circuit board (9) and outside the housing (2) being associated at the other side with a plug connection coupling.

* * * * *